May 23, 1933. C. F. FINCH 1,909,941
FASTENING DEVICE
Filed April 25, 1932
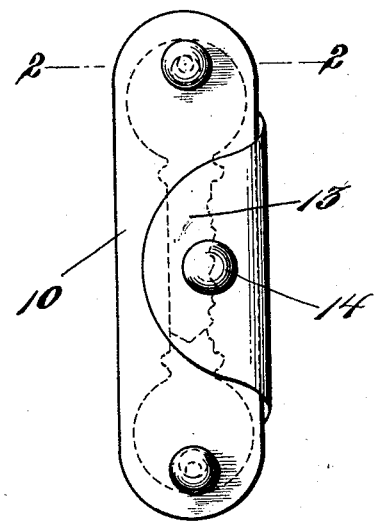
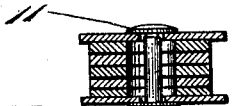
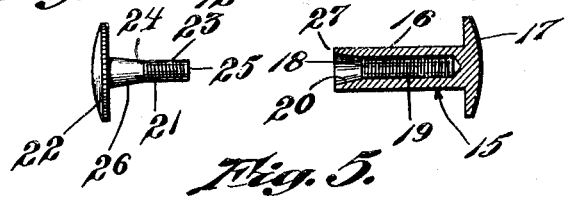
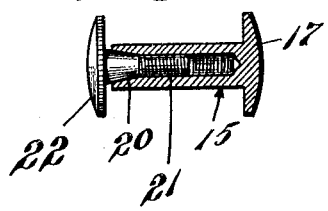
INVENTOR.
Caleb F. Finch
BY Barlow & Barlow
ATTORNEYS.

Patented May 23, 1933

1,909,941

UNITED STATES PATENT OFFICE

CALEB F. FINCH, OF PROVIDENCE, RHODE ISLAND, ASSIGNOR TO RAU FASTENER COMPANY, A CORPORATION OF RHODE ISLAND

FASTENING DEVICE

Application filed April 25, 1932. Serial No. 607,393.

This invention relates to a fastening device having separable parts and has for one of its objects to provide means for locking the separable parts of the device in assembled relation.

Another object of this invention is the provision of a construction having stud and socket members which threadingly engage, such that the threads will cooperate with some means additional to the threads to prevent the parts from being unscrewed one with relation to the other.

A further object of the invention is the provision of a construction which will be simple and inexpensive to make and one which through continued operation will not loose its efficiency in locking the parts together.

With these and other objects in view, the invention consists of certain novel features of construction, as will be more fully described, and particularly pointed out in the appended claims.

In the accompanying drawing:

Fig. 1 is a plan view of a key case in which my fastening device is here shown for the purpose of illustration.

Fig. 2 is a section on line 2—2 of Fig. 1.

Fig. 3 is a side elevation of the stud member.

Fig. 4 is a central sectional view of the socket member.

Fig. 5 is a view showing the stud and socket member assembled with the socket member in section.

Fastening devices employing screw machine threadingly engaging parts cannot be made in a practical way such that the threads will tightly fit, and accordingly when the parts engage they are somewhat loose and there is not a sufficiently close fit to cause enough friction to prevent accidental unscrewing of the parts, and accordingly it is usual in the provision of such structures to provide a head or some abutment against which one of the members will engage to force one edge of the threads against one edge of the helical groove in which it is lodged so that sufficient pressure is developed to cause friction to retard an unscrewing movement of the parts. This, however, is not satisfactory as it may easily become loosened whereas by my invention I provide a construction which will not accidentally become so loosened.

In the illustration which I have chosen to show this invention the fastening device is of that character used in a key case and consists of a socket member having a tubular shank with a head at one end and a stud member also having a shank with a head at one end, which shanks are threaded together. Before the advent of this invention it was usual that the end of the tubular shank of the socket member would engage the head of the stud member with such pressure as could be had to prevent unscrewing by reason of tightly turning the parts together through engagement with their heads. It was desired that the heads be as thin as possible to prevent their being cumbersome in their use in a key holder such as I have shown which is placed in the pocket, and tight turning was retarded to some extent by the thinness of the heads which could not be readily gripped.

In order that these undesirable conditions may be avoided and yet obtain a greater securing action between the parts, I have provided a tapered inner surface at the end of the shank of the socket member with a conical surface on the stud member to engage therewith so that as the parts are screwed together these two surfaces are forced one into the other with a binding fit and thus I provide an increased surface engagement to frictionally lock the parts against unthreading for separation. This arrangement is such that, although subject to some wear, the wear will be taken up by reason of the shape of the parts so that the lock cannot become loosened even though the threads become worn by use; and the following is a detailed description of the present embodiment of this invention illustrating the preferred means by which these advantageous results may be accomplished.

With reference to the drawing, I have shown in Fig. 1 a key case 10 formed of a flexible cover such as leather with piercings 11 and 12 on either side through which there extends the fastening device for the mounting of the keys. A lip 13 with a snap fastener, button or other securing means 14 is provided for holding the case in closed position.

The fastening device for suspending the keys consists of a socket member 15 having a shank portion 16 with an integral head 17 and a bore 18 threaded as at 19 for a portion of the length and leaving an unthreaded tapered flaring portion 20 at its free end.

The stud member consists of a threaded shank 21 and an integral head 22. The threads 23 on this shank terminate at a point 24 spaced from the end 25 and between this point of termination of the threads and the head there is provided a conical surface 26 which substantially fits the conical surface 20 in the socket member. For engagement the threaded shank 21 is inserted into the bore 18 to engage the threads 19 thereof and the parts are screwed together until the surfaces 20 and 26 tightly bind; which will occur in a position substantially as illustrated in Fig. 5, with the end 27 of the socket member spaced from the inner surface of the head 22 of the stud member. The taper may be varied in a degree to cause the desired binding action between the parts.

If the threads become worn or enlarged or if some wear takes place between the tapered surfaces the parts will be drawn slightly closer together and the frictional contact between the surfaces of the parts will be maintained to lock the parts together and thus will require additional rotating strain between the parts to loosen them for disengagement.

It will clearly be seen, by referring to Figure 2 of the drawing, that the size of the opening 11 in the key case 10 adjacent the head on the stud member is such that it permits the relative free movement of the stud member within the socket member for adjusting the frictional contact described above.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A fastening device adapted to extend through aligned openings in a casing, comprising a socket member having a tubular internally threaded shank and an internally flaring non-threaded seat at one end, a stud member having a threaded shank adapted to engage said internal threads and having a tapered portion complementary to the tapered portion in the socket member, whereby the stud member threadedly advances within the theaded portion of the socket member upon relative rotation of said members, until the tapered portions are brought into frictional engagement, the tapered portion of the stud being of greater length than the flaring seat of the socket member, whereby the tapered portion of the socket member may be forced along the tapered seat of the stud member to a degree necessary to alone insure positive locking of the members, and the openings in the casing being greater than the outside diameter of said socket and stud members to permit the relative free movement between said members.

2. A fastening device adapted to extend through aligned openings in a casing, comprising a socket member having a tubular internally threaded shank with an internally flaring non-threaded seat at one end, and an enlarged head at the other end, a stud member having an enlarged head at one end, a threaded shank at the opposite end adapted to engage said internal threads and having a tapered portion complementary to the tapered portion in the socket member, whereby the stud member threadedly advances within the threaded portion of the socket member upon relative rotation of the heads on said members, until the tapered portions are brought into frictional engagement, the tapered portion of the stud member being of greater length than the flaring seat of the socket member, whereby the tapered portion of the socket member may be forced along the tapered seat of the stud to a degree necessary to alone insure positive locking of the members, and the openings in the casing being greater than the outside diameter of said socket and stud members to permit the relative free movement between said members.

In testimony whereof I affix my signature.

CALEB F. FINCH.